(12) United States Patent
Loh

(10) Patent No.: US 9,971,700 B2
(45) Date of Patent: May 15, 2018

(54) CACHE WITH ADDRESS SPACE MAPPING TO SLICE SUBSETS

(71) Applicant: Advanced Micro Devices, Inc., Sunnyvale, CA (US)

(72) Inventor: Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 99 days.

(21) Appl. No.: 14/934,874

(22) Filed: Nov. 6, 2015

(65) Prior Publication Data

US 2017/0132147 A1 May 11, 2017

(51) Int. Cl.
*G06F 12/00* (2006.01)
*G06F 12/10* (2016.01)
*G06F 12/0815* (2016.01)

(52) U.S. Cl.
CPC .......... *G06F 12/10* (2013.01); *G06F 12/0815* (2013.01); *G06F 2212/6082* (2013.01)

(58) Field of Classification Search
CPC .............. G06F 12/10; G06F 12/0815; G06F 2212/6082; G06F 12/0811; G06F 12/0851; G06F 12/0824; G06F 12/0864
USPC ........ 711/118, 119, 120, 122, 127, 140, 146, 711/129, 124, 144
See application file for complete search history.

(56) References Cited

U.S. PATENT DOCUMENTS

| | | | |
|---|---|---|---|
| 6,748,501 B2 * | 6/2004 | Arimilli | G06F 9/3004 711/145 |
| 8,161,242 B2 | 4/2012 | Qureshi | |
| 8,433,851 B2 * | 4/2013 | Clark | G06F 12/0811 711/128 |
| 2006/0112228 A1 * | 5/2006 | Shen | G06F 12/084 711/133 |
| 2009/0083489 A1 * | 3/2009 | Clark | G06F 12/0851 711/129 |
| 2009/0240889 A1 * | 9/2009 | Choy | G06F 12/0815 711/121 |
| 2011/0087843 A1 * | 4/2011 | Zhao | G06F 12/0864 711/129 |
| 2011/0153948 A1 * | 6/2011 | Vash | G06F 12/0815 711/130 |
| 2013/0346694 A1 * | 12/2013 | Krick | G06F 12/0811 711/122 |
| 2014/0006715 A1 * | 1/2014 | Saraf | G06F 12/0692 711/129 |
| 2014/0189239 A1 * | 7/2014 | Hum | G06F 12/0831 711/122 |
| 2016/0202989 A1 * | 7/2016 | Eisen | G06F 9/3851 712/215 |

(Continued)

OTHER PUBLICATIONS

Irazoqui et al. "Systematic Reverse Engineering of Cache Slice Selection in Intel Processors", Digital System Design (DSD), 2015 Euromicro Conference on, Aug. 26-28, 2015, IEEE, Oct. 26, 2015, pp. 629-636.*

*Primary Examiner* — Hong Kim

(57) ABSTRACT

A processing device includes a cache implementing a set of at least three cache slices. Each cache slice is to store a corresponding set of cache lines. The cache further includes cache control logic coupled to the set of at least three cache slices. The cache control logic is to map addresses of an address space to the cache such that each address within the address space maps to a corresponding strict subset of two or more cache slices of the set of cache slices.

17 Claims, 5 Drawing Sheets

(56) References Cited

U.S. PATENT DOCUMENTS

2016/0283374 A1* 9/2016 Pal .................... G06F 12/084
2016/0357674 A1* 12/2016 Waldspurger ....... G06F 12/0831

* cited by examiner

CACHE WITH ADDRESS SPACE MAPPING TO SLICE SUBSETS

BACKGROUND

Field of the Disclosure

The present disclosure relates generally to multiple-core processing systems and, more particularly, to caching in multiple-core processing systems.

Description of the Related Art

Larger caches, such as last-level caches, typically are implemented as a collection of several smaller, separate cache "slices." Each slice has a corresponding set of cache lines and access circuitry for accessing the set of cache lines. In conventional processing systems, the cache may be set up as either an address-interleaved cache or a per-core cache. For a conventional address-interleaved cache, each memory address of an address space associated with the cache is mapped to only a single cache slice. This approach has the benefit of reducing or eliminating the overhead involved in maintaining coherence within the cache as only one cache slice can contain a valid copy of the data associated with a given memory address. However, this approach also can increase cache latency because cache accesses initiated by a processor core may need to be routed to a physically distant slice, and this latency can significantly impact the performance of the processor core.

Conversely, in a per-core cache, each cache slice is assigned to only one corresponding processor core, or to only a corresponding small cluster of cores, and thus operates to maintain the cached data for the corresponding processor core or core cluster. In effect, each slice operates as a private cache for a single processor core or small cluster of processor cores. This results in reduced cache access latency as there is minimal communication distance between the processor core or cluster and the corresponding cache slice. However, the trade-off is that the coherency mechanism for maintaining coherency within the cache is considerably more complex as all slices associated with the same address space must maintain coherence, and thus numerous coherency transactions (invalidations, for example) will be transmitted for each cache access to a local cache slice that impacts the coherency of the other cache slices. Moreover, the total effective storage capacity of the cache is diminished in per-core cache configurations because the same data is redundantly stored multiple times across different slices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate a multi-core processing system implementing a hybrid cache and methods of its operation. In at least one embodiment, the hybrid cache comprises a set of at least three cache slices. Each cache slice has a corresponding set of cache lines. The hybrid cache is configured to map memory addresses of one or more address spaces among the slices on the basis of a hybrid slice allocation that blends the different approaches of a per-core cache and an address-interleaved cache. Rather than limiting mapping of a memory address to only one slice, as found in conventional address-interleaved approaches, in at least one embodiment each memory address may be mapped to a strict subset (also known as a "proper subset") of at least two slices of the set of slices. That is, there is at least one slice of the set that is not present in the corresponding strict subset. Thus, when conducting a cache access operation for a cache access request, the cache access operation may be limited to only the slices of the strict subset. Moreover, because a memory address maps to only a strict subset of slices, coherency only needs to be maintained among a smaller, bounded number of slices (that is, the slices of the corresponding strict subset), and thus requiring reduced coherency complexity compared to address-interleaved caches. Further, under this approach, a memory address is more likely to be mapped to a slice closer to the processor core initiating the cache access operation that references the memory address, thereby resulting in an overall reduction in cache access latency compared to per-core caches. As such, the embodiments of a hybrid cache described herein may provide the advantages of each of the per-cache core and the address-interleaved core configurations, while reducing or eliminating the disadvantages of these conventional cache configurations.

Figure 1:
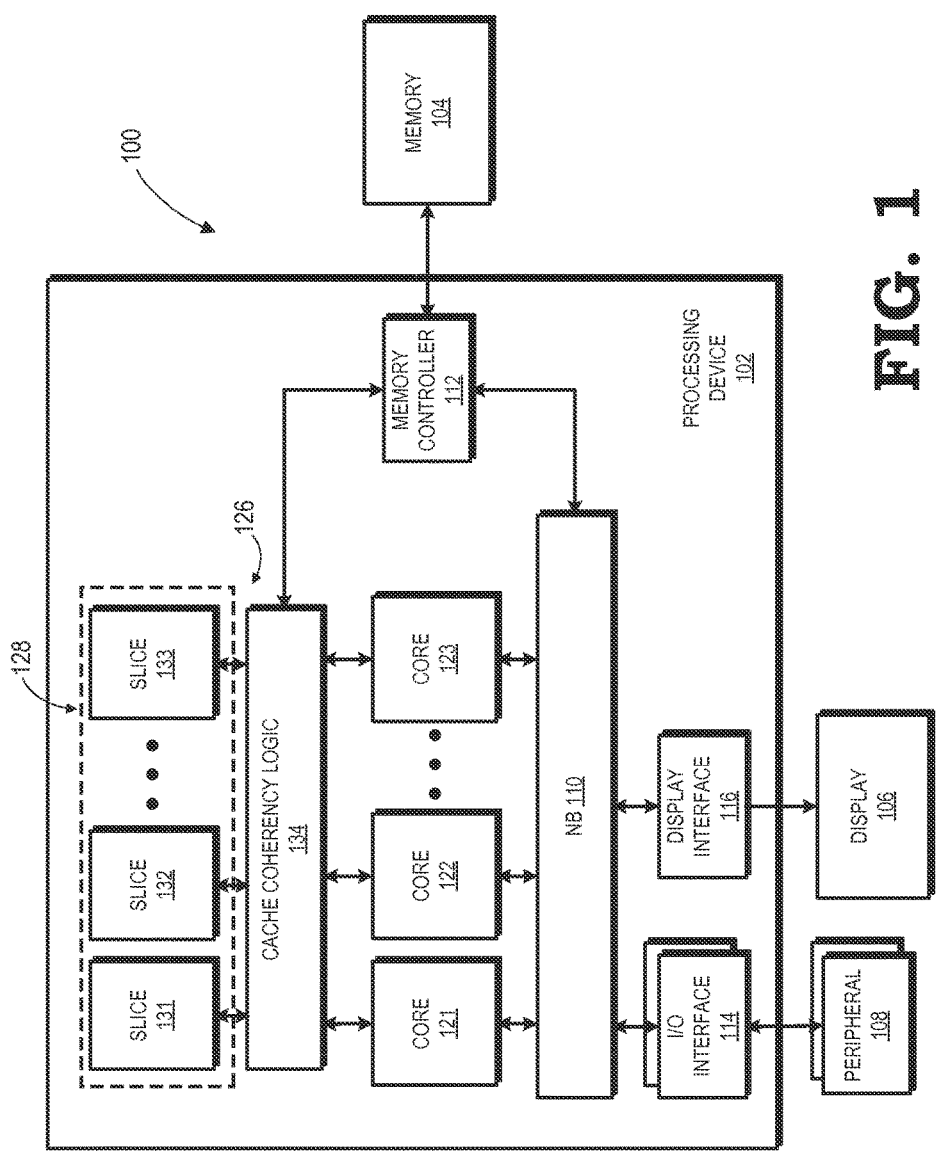
FIG. 1 is a block diagram of a multi-core processing system in accordance with some embodiments.

FIG. 1 illustrates a multi-core processing system 100 in accordance with some embodiments. The processing system 100 may be implemented in, for example, a desktop computer, laptop computer, a tablet computer, a computing-enabled cellular phone, a gaming console, a personal digital assistant, a computing-enabled watch or other computing enabled wearable device, and the like. In the depicted example, the processing system 100 includes a processing device 102 coupled to a memory 104 (e.g., system memory), a display 106, and one or more peripherals 108 (e.g., touchscreen, keyboard, mouse, printer, and the like). The processing device 102 may be implemented as a single integrated circuit, or as a combination of multiple integrated circuits, such as a system-on-a-chip (SoC). To illustrate, the processing device 102 (and the functional units formed thereon) may form part of one semiconductor die, while the memory 104 forms part of a different semiconductor die.

The processing device 102 includes multiple processor cores coupled to a northbridge (NB) 110, which in turn is coupled to a memory controller 112, one or more input/output (I/O) interfaces 114, a display interface 116, and the like. The multiple processor cores (identified in FIG. 1 as processor cores 121, 122, and 123) may include, for example, central processing unit (CPU) cores, graphics processing unit (CPU) cores, digital signal processors (DSPs), and the like.

The processing device 102 further includes a cache hierarchy having one or more levels of cache, including a hybrid cache 126. In the depicted embodiment, the hybrid cache 126 is implemented as a last-level cache in the cache hierarchy, but in other implementations the hybrid cache 126 may be implemented as a higher-level cache. Further, the cache hierarchy of the processing device 102 may implement multiple hybrid caches configured in accordance with the teachings of the present disclosure. The hybrid cache 126 comprises a set 128 composed of three or more cache slices (referred to herein as "slices"), such as the illustrated slices 131, 132, and 133, and cache control logic 134 coupled to the set 128 of slices and coupled to the plurality of processor cores 121-123. As explained in greater detail below with reference to FIG. 2, each slice comprises a set of cache lines configured to store data in association with a corresponding memory address from a specified memory address space. To this end, the slice may be implemented as a tag array (not shown) and a data array (not shown), with a tag portion of each cache line found in a corresponding entry of the tag array and a data portion of each cache line found in a corresponding entry of the data array.

For ease of reference, the cache control logic 134 is depicted in FIG. 1 as a monolithic logic block coupled to each slice and coupled to each processor core. However, in certain implementations, each slice is implemented with, or otherwise associated with, a corresponding processor core, and each processor core implements a corresponding logic portion of the cache control logic 134 for maintaining the corresponding slice. In such cases these logic portions are collectively represented by the cache control logic 134. The cache control logic 134 operates to receive cache access requests from the plurality of cores 121-123, and for each cache access request perform a probe of the cache slices to determine whether the data referenced by the cache access request is present in a cache slice. If so, the cache control logic 134 is to perform the cache operation represented by the cache access request using the data found in the cache slice.

In at least one embodiment, the hybrid cache 126 is configured as a hybrid of a per-core cache and an address-interleaved cache. In this configuration, the cache control logic 134 operates to map memory addresses of a memory address space associated with the hybrid cache 126 to a corresponding strict, or "proper", subset of two or more slices of the set 128 of slices. As such, each memory address of the address space may store valid copies of data in some, but not all, of the slices of the hybrid cache 126. For example, if the set 128 contains eight slices, the cache control logic 134 may be configured to map each memory address to two slices or four slices. Similarly, if the set 128 contains nine slices, the cache control logic 134 may be configured to map each memory address to three slices. As another example, if the set 128 contains thirty-two slices, the cache control logic 134 may be configured to map each memory address to either two, four, six, eight, or sixteen slices. Generally, the number of slices in the set 128 and the number of slices in the subset are designed or selected so that the number of slices in the set 128 is an integer multiple of the number of slices in the subset, but in certain implementations this arrangement is not necessary so long as precautions are taken to ensure that a memory address does not map to a non-existent slice. Further, in at least one embodiment, the strict subsets are mutually-exclusive; that is, a slice may be allocated or associated with only one strict subset.

By mapping addresses to some but not all of the slices of the set 128, the hybrid cache 126 may take advantage of the benefits of each of the per-core and address-interleaved cache configurations while reducing or eliminating the particular disadvantages of these conventional cache configurations. To illustrate, by mapping a memory address to two or more slices, the effective storage capacity of the hybrid cache 126 is improved over a per-core cache having the same total storage capacity. Further, the average distance between the requesting component and the requested data is reduced compared to a per-core configuration, which in turn improves the cache access latency of the hybrid cache 126 compared to per-core caches. Conversely, by mapping memory addresses to only a strict subset of the slices (that is, fewer than all of the slices of the set), the coherency mechanism used to maintain coherency in the hybrid cache 126 typically is less complex than that needed in a conventional address-interleaved cache having the same number of slices as a cache operation impacting the coherency of a memory address need not be communicated to every other slice in the cache.

The proportion of slices of the strict subset to the number of slices in the set 128 represents a tradeoff between the advantages and disadvantages of the per-core cache configuration and the advantages and disadvantages of the address-interleaved cache configuration. Accordingly, this proportion may be selected or otherwise designed in view of the particular configuration of the processing device 102 and the goals of the designer. To illustrate, if there is to be more emphasis on reduced coherency complexity than on effective cache utilization and latency, the subset may be a smaller number of slices of the set 128. Conversely, if effective cache utilization and reduced latency are key goals, the subset may be a larger number of slices of the set 128. Further, as described in greater detail below, the number of slices in the subset may be programmable, either at initialization or during runtime.

Figure 2:
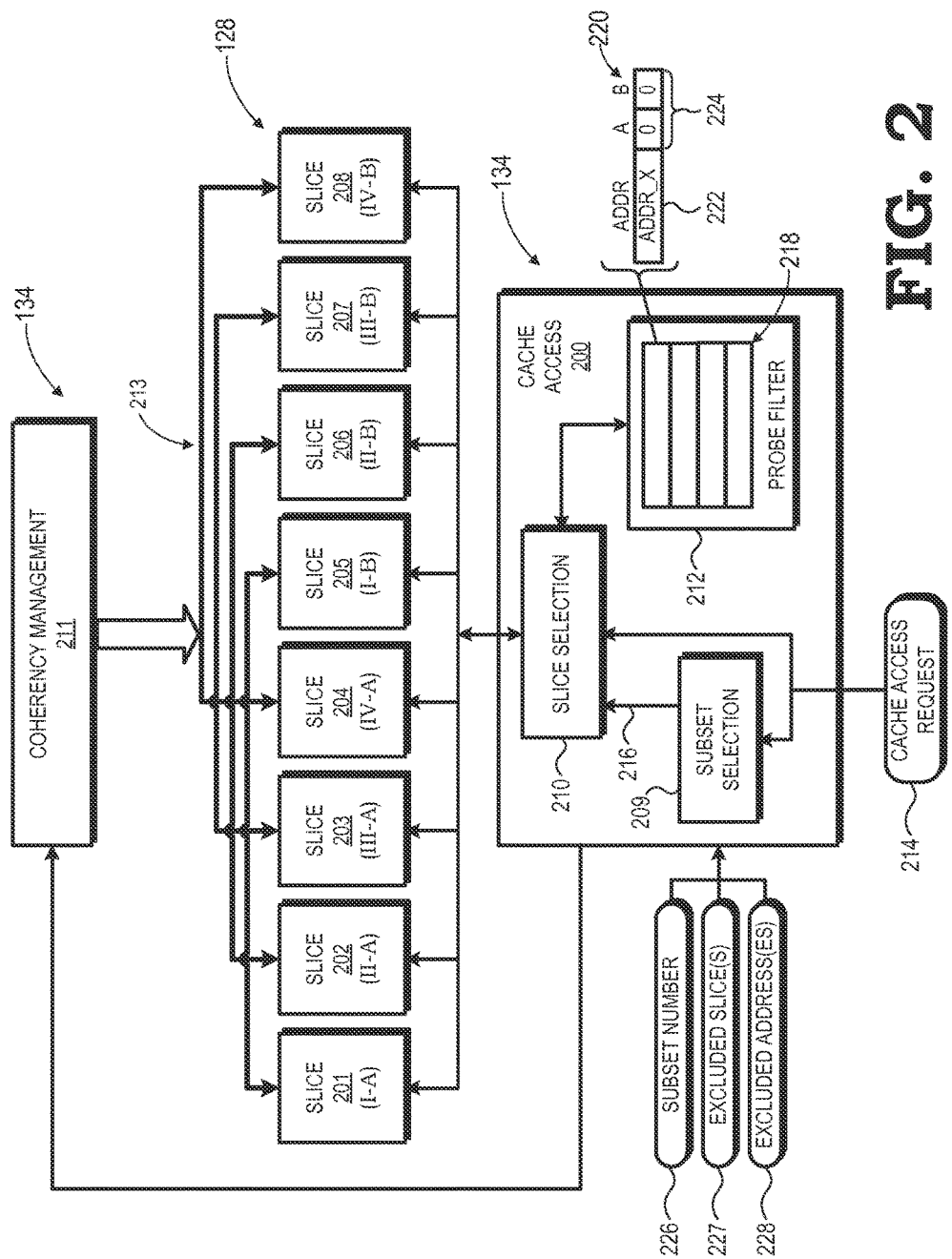
FIG. 2 is a block diagram illustrating a hybrid cache of the processing system of FIG. 1 in greater detail in accordance with some embodiments.

FIG. 2 illustrates an implementation of the hybrid cache 126 of the processing system 100 in accordance with at least one embodiment of the present disclosure. In the depicted example, the set 128 of slices of the hybrid cache 126 includes eight slices: slices 201, 202, 203, 204, 205, 206, 207, 208 (collectively, "slices 201-208"), and the cache control logic 134 includes cache access logic 200 for accessing the slices 201-208 and a coherency mechanism including a coherency interconnect structure 213 and coherency management logic 211. Although FIG. 2 illustrates an implementation of the coherency management logic 211 as a single unit, it will be appreciated that the coherency management logic 211 instead be implemented in a distributed manner. The cache access logic 200 in turn may include subset selection logic 209, slice selection logic 210. Further, in some instances the cache access logic 200 may maintain a probe filter 212.

Further, in the illustrated embodiment, the set 128 of slices is organized into mutually-exclusive strict subsets of two slices each, such that the set 128 has four subsets I, II, III, and IV, where: subset I is composed of slices 201 and 205; subset II is composed of slices 202 and 206; subset III is composed of slices 203 and 207; and subset IV is compose of slices 204 and 208. To facilitate identification of the association of slices and subsets, the slices 201-208 each is enumerated with its corresponding subset (I, II, III, and IV) and whether it is the first (A) or second (B) slice in the subset. Thus, slice 202 is marked (II-A) to indicate it is the first slice in the second subset II, and slice 208 is marked (IV-B) to indicate it is the second slice in the fourth subset IV.

The subset selection logic 209 operates to map memory addresses of an address space to corresponding strict subsets of the set 128 of slices of the hybrid cache 126. To this end, in response to detecting issuance of a cache access request 214 by one of the processor cores 121-123 (or by one of the peripherals 108 in some instances), the subset selection logic 209 uses the memory address associated with the cache access request 214 to generate an index value 216 identifying a corresponding strict subset of the set 128 of slices to which the memory address is mapped. Any of a variety of mapping functions may be used to provide this mapping between memory address and index value 216. For example, the subset selection logic 209 may include logic to perform a modulo X function to the memory address of the cache access request and use the resulting remainder as the index value 216, whereby X is an integer equal to the number of strict subsets in the set 128 of slices. To illustrate using the four subset configuration of FIG. 2, the subset selection logic 209 may apply a modulo 4 function to the memory address specified by the cache access request 214, and the resulting remainder (with a value between 0 and 3) used as the index value 216 to identify which of the four subsets I-IV is associated with the memory address.

The slice selection logic 210 uses the index value 216 supplied by the subset selection logic 209 to route the cache access to the slices of the strict subset identified by the index value 216. When accessing a slice of the identified strict subset, the slice selection logic 210 uses at least a portion of the memory address of the cache access request 214 to determine whether there is a "slice hit" in the accessed slice (that is, whether a cache line of the slice contains valid data associated with the memory address). In some embodiments, the slice selection logic 210 may access each slice of the subset in a specified order (e.g., the "A" slice first and the "B" slice second) until a cache hit occurs or every slice of the subset has been probed. In other embodiments, the slice selection logic 210 may use various parameters in determining the selection order of slices within a subset. To illustrate, the slice selection logic 210 may maintain a data structure storing distance information that indicates a communication distance of each slice of the set 128 from the slice selection logic 210. When selecting a slice from a subset, the slice selection logic 210 may select slices in a slice order that gives priority to slices closer to the slice selection logic 210 over slices further from the slice selection logic 210 in an attempt to reduce cache access latency.

In some implementations, the hybrid cache 126 may implement the probe filter 212 so as to limit the number of probes performed within the identified subset of slices. To illustrate, the probe filter 212 may implement a directory 218 having a plurality of entries 220. Each entry 220 has a field 222 to store at least a portion of a memory address associated with data stored in the set 128 of slices and a bit vector 224 representing which slices of the corresponding subset of slices mapped to the memory address contain a valid cache line for the memory address (that is, store a valid copy of the data associated with the memory address). Typically, this bit vector 224 includes a bit for each slice of the strict subset, and thus the number of bits in the bit vector 224 is equal to the number of slices in the strict subset. To illustrate, for the four subset/two slices per subset configuration of FIG. 2, the bit vector 224 would include two bits: a bit A for the first slice of the subset; and a bit B for the second slice of the subset. In contrast, a directory for a conventional per-core cache typically requires a bit vector having a number of bits equal to the total number of slices. Thus, in an eight-slice configuration, a conventional directory would implement eight-bit bit vectors, whereas the hybrid configuration of FIG. 2 requires only two-bit bit vectors, and thus results in a significantly more compact directory compared to the conventional approach.

With the probe filter 212, rather than sequencing through the slices of the indicated subset or attempting to access all in parallel with the resulting complexity in sorting out the responses, the slice selection logic 210 may consult the probe filter 212 to determine whether the referenced data is in the hybrid cache 126 (that is, whether there is an entry 220 for the memory address in the directory 218) and assuming the referenced data is present, the slice selection logic 210 may determine which of the two slices in the subset identified by the index value 216 from the subset selection logic 209 contains a valid copy of the referenced data from the bit vector 224 in the corresponding entry 220, and target a probe or cache access for the data to a slice accordingly.

In some embodiments, one or more parameters pertaining to the slice subset allocation process may be programmed or otherwise configured via software executed at the processing system 100. To illustrate, the cache access logic 200 may include or have access to parameter storage elements 226, 227, 228. In some instances, there may be multiple copies of one or more of these parameters storage elements, each of which may be used for a different thread, program, operating system, or address space. The parameter storage element 226 may store a value representing the number of slices to include in each strict subset of slices to which a memory address maps (which then also may define the number of strict subsets in the set 128), or alternatively, the number of strict subsets to be organized from the set 128 (which then also may define the number of slices in each strict subset). This programmability permits, for example, different threads or programs having different address spaces to implement different subset proportions for different performance or complexity goals. Further, in some instances, the processing system 100 may implement a tuning or calibration process as execution progresses so as to calibrate an optimal proportion of slices of the subset to total slices based on observation of the performance of a thread or program over time under different slice settings.

The parameter storage element 227 may store a bit vector or other data structure that identifies which slices of the hybrid cache 126 are to be excluded from the mapping process. This may be a global parameter—that is, applying to all addresses within the address space, or may be applicable to a particular range or other subset of addresses of the address space. To illustrate, if the value stored in the parameters storage element 226 indicates that each subset is to include four slices and there are ten slices total in the hybrid cache, the parameter storage element 227 may be programmed to exclude the ninth and tenth slices from inclusion in the hybrid mapping process. The parameter storage element 228 may store one or more values or data structures that identify addresses to be excluded from the hybrid mapping process. To illustrate, a particular address range may be identified as associated with uncacheable data, and thus a mask may be programmed into the parameter storage element 228 so that the slice selection logic 210 or other component of the cache control logic 134 prevents cache access requests associated with memory addresses in this specified range from accessing the hybrid cache 126.

As a memory address maps to two or more slices in the hybrid cache 126, a cache operation for the memory address with respect to the cache line in one slice may have coherency implications for copies of the same cache line in other slices of the same subset. Accordingly, the coherency management logic 211 and the coherency interconnect structure 213 operate to maintain coherency for the data of the hybrid cache 126. Accordingly, when the cache access logic 200 signals that a cache access operation (e.g., a read, a write, a modify, etc.) has been performed to a particular cache line of a particular slice, the coherency management logic 211 determines whether the operation impacts coherency, and if so, utilizes the coherency interconnect structure 213 to update the copies of the impacted cache line in the other slice(s) of the subset.

As noted above, a conventional address-interleaved cache typically does not require a coherency mechanism within a given socket as there is at most one copy of a particular data within the cache (although coherency may need to be maintained between sockets in a multiple-socket system). However, in a per-core cache, any slice of the cache could have a copy of a particular data, and thus the coherency interconnect in a conventional per-core cache typically is implemented as a multiple-drop/mesh structure that connects every slice to every other slice. This results in a complex coherency interconnect that requires considerable floorplan space and may consume considerable power. In contrast, because fewer than all of the slices are mapped to a given memory address, the coherency mechanism of the hybrid cache 126 may be less complex and consume less power than those found in a conventional per-core cache. To illustrate, in the four subset configuration of FIG. 2, each memory address maps to a subset of two slices, and thus a cache operation that impacts coherency requires updating only one other slice at most. Thus, as shown in FIG. 2, the coherency interconnect structure 213 may be implemented as a set of four two-drop buses, with each two-drop bus connecting the two slices of a corresponding subset of slices, which is a simpler configuration than the eight-drop bus typically needed to maintain coherency in a conventional address-interleaved cache.

Figure 3:
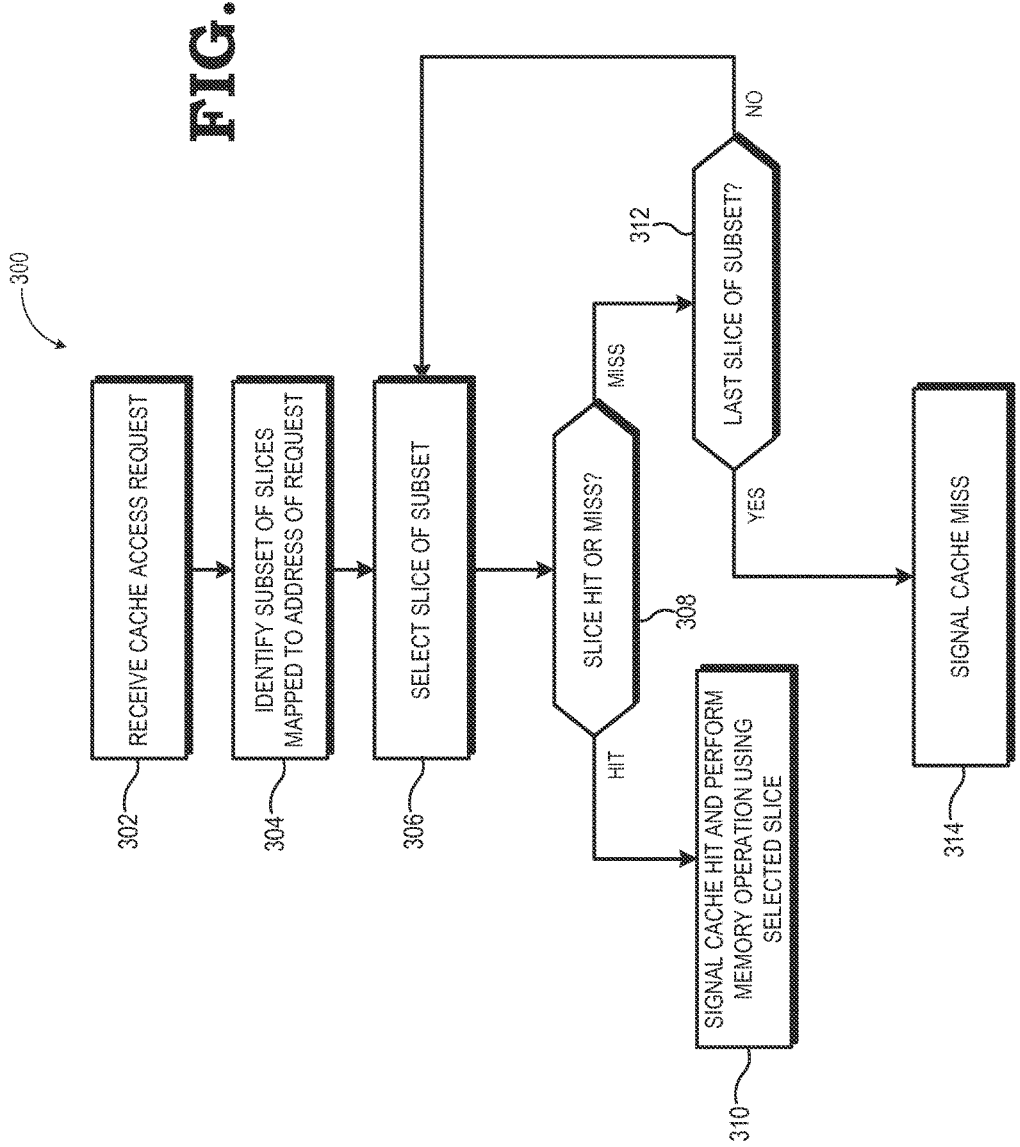
FIG. 3 is a flow diagram illustrating a method for performing a cache access operation in the hybrid cache of FIG. 2 in accordance with some embodiments.

FIG. 3 illustrates an example method 300 of operation of the hybrid cache 126 of the processing system 100 in accordance with at least one embodiment of the present disclosure. For ease of reference, the method 300 is described in the example context of the implementation of the hybrid cache 126 of FIG. 2. The method 300 initiates at block 302 with the receipt or detection of a cache access request (e.g., cache access request 214) issued by one of the processor cores 121-123 at the cache control logic 134 of the hybrid cache 126. The cache access request represents a request to perform an indicated cache operation with respect to the data/cache line associated with a memory address identified by the cache access request. Accordingly, at block 304 the subset selection logic 209 applies a modulo function or other mapping function to identify the subset of slices of the set 128 of slices that are mapped to the memory address. In the example of FIG. 2, there are four strict subsets within the set 128 of slices, and thus the particular subset is identified via an index value 216 generated from the application of a modulo 4 function to the memory address by the subset selection logic 209.

At block 306, the slice selection logic 210 uses the subset identified at block 304 to identify the slices of the identified strict subset and to perform a cache lookup to only those slices of the identified strict subset. Typically, in the absence of the use of the probe filter 212, this cache lookup includes sequentially accessing the slices of the identified strict subset until a valid cache line is found in one of the slices or all of the slices have been probed without finding a valid cache line for the memory address. Accordingly, the slice selection logic 210 selects a slice of the subset to probe for a valid copy of the data referenced by the memory address. As described above, the slice selection logic 210 may select slices in a preset order within the subset (e.g., slice "A" and then slice "B"). In other embodiments, the slice selection logic 210 may utilize other parameters in the selection order, such as by selecting slices based on their relative communication distances, as described above. Further, in some embodiments, rather than a sequential access, the slice selection logic 210 may perform accesses to one or more of the identified slices concurrently. For example, the slice selection logic 210 may identify the closest slice and access that slice first, and if the valid cache line is not found in the closest slice, then access the remaining identified slices in parallel.

At block 308, the slice selection logic 210 probes the selected slice to determine whether the selected slice has a cache line storing a valid copy of the data referenced by the memory address (that is, a "slice hit"). If so, at block 310 the cache control logic 134 performs the cache operation represented by the cache access request using the copy of the data in the cache line of the selected slice. In the event that the performance of the operation affects the coherency of other copies of the data that may be present in the other slices of the strict subset, the coherency management logic 211 may utilize the coherency interconnect structure 213 to transmit coherency transactions to update the other copy or copies of the data in the other slices of the subset.

Returning to block 308, if a valid cache line for the memory address is not present in the selected slice, at block 312 the slice selection logic 210 checks whether the selected slice is the last slice to be checked in the strict subset. If so, all slices of the subset have been probed and returned with a slice miss, and thus a valid copy of the data is not present in the hybrid cache 126. Accordingly, at block 314 the cache control logic 134 signals a cache miss, which in turn may trigger a probe of a higher-level cache, or an access to the memory 104 to perform the indicated cache operation. However, if the selected slice is not the last slice of the subset in the selection order, the flow of method 300 returns to block 306, and the slice selection logic 210 selects the next slice of the subset in accordance with the selection order, and another iteration of the process represented by blocks 308, 310, 312, and 314 is performed with the newly-selected cache slice of the subset.

As described above, in some implementations the hybrid cache 126 may utilize the probe filter 212 to track which slices of a subset maintain a valid copy of the data associated with a memory address. In such instances, the slice selection logic 210 may use the probe filter 212 to positively identify which slices, if any, contain a valid copy without having to sequentially probe each slice of the subset until a valid copy is found. In such instances, the process of blocks 306, 308, and 312 may be replaced by the process of the slice selection logic 210 accessing the probe filter 212 to identify which slices, if any, store a valid copy. In the event that multiple slices of the subset have a valid copy, the slice selection logic 210 may use, for example, slice distance information to select the closest slice having a valid copy to perform the cache operation at block 310.

Figure 4:
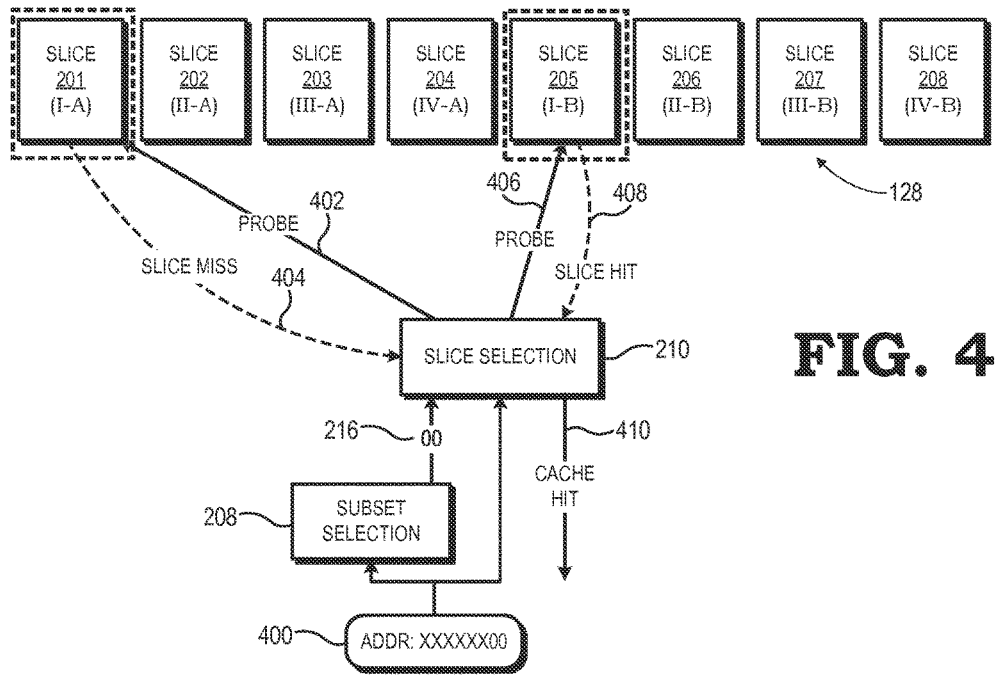
FIG. 4 is a diagram illustrating an example operation of the method of FIG. 3 in accordance with at least one embodiment of the present disclosure.
Figure 5:
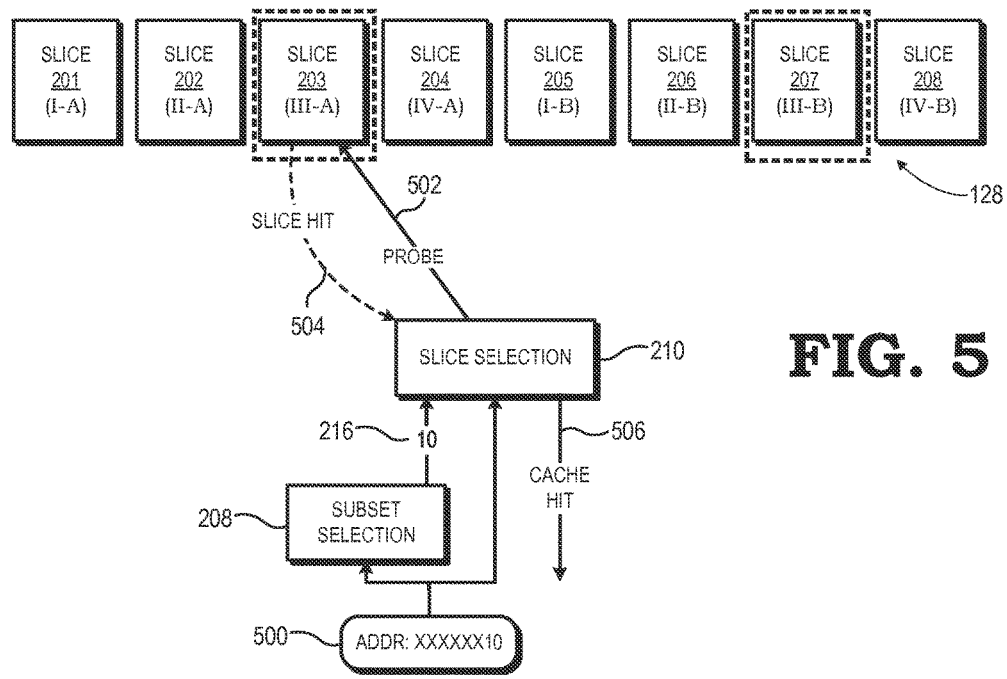
FIG. 5 is a diagram illustrating another example operation of the method of FIG. 3 in accordance with at least one embodiment of the present disclosure.

FIGS. 4 and 5 illustrate examples of the hybrid mapping process of the hybrid cache 126 using the implementation of the set 128 with eight slices 201-208 and two slices per subset as shown in FIG. 2. In the example of FIG. 4, a cache access request 400 is received at the hybrid cache 126. The cache access request 400 has a memory address of XXXXX00, and thus when the subset selection logic 209 applies the modulo 4 function to the memory address, the resulting remainder 00 is provided as index value 216, and thus identifying subset 00, or subset I, as the subset to which memory address XXXXXX00 is mapped. Subset I contains slices 201 and 205. The slice selection logic 210 identifies slice 201 as the first slice of subset I to be probed and thus initiates a probe 402 to slice 201 (I-A). In this particular example, slice 201 does not have a valid copy of the data, and thus returns a slice miss 404. In response to the slice miss 404, the slice selection logic 210 selects the next slice, slice 205 (II-B), and initiates a probe 406 to the slice 205. In this example, slice 205 has a cache line storing a valid copy of the data, and thus the slice 205 signals a slice hit 408, which in turn triggers the cache control logic 134 to signal a cache hit 410 and to perform the cache operation requested by the cache access request 400 using the identified copy of the data in the slice 205.

In the example of FIG. 5, a cache access request 500 referencing a memory address XXXXXX10b is received at the hybrid cache 126. The subset selection logic 209 applies the modulo 4 function to the memory address, and the resulting remainder 10b is provided as index value 216, which identifies subset 10, or subset III, as the subset to which memory address XXXXXX10b is mapped. Subset III contains slices 203 and 207. In this particular access, the slice selection logic 210 uses the probe filter to obtain a bit vector 224 of "10" for the indicated memory address, and thus signaling that the first slice of the subset, that is, slice 203, contains a valid copy of the data and the second slice of the subset, that is, slice 207, does not contain a valid copy. Thus, the slice selection logic 210 initiates a probe 502 to the slice 203, which, having a valid copy of the identified data, returns a slice hit 504, in response to which the cache control logic 134 signals a cache hit 506 and performs the cache operation requested by the cache access request 500 using the identified copy of the data in the slice 203.

Figure 6:
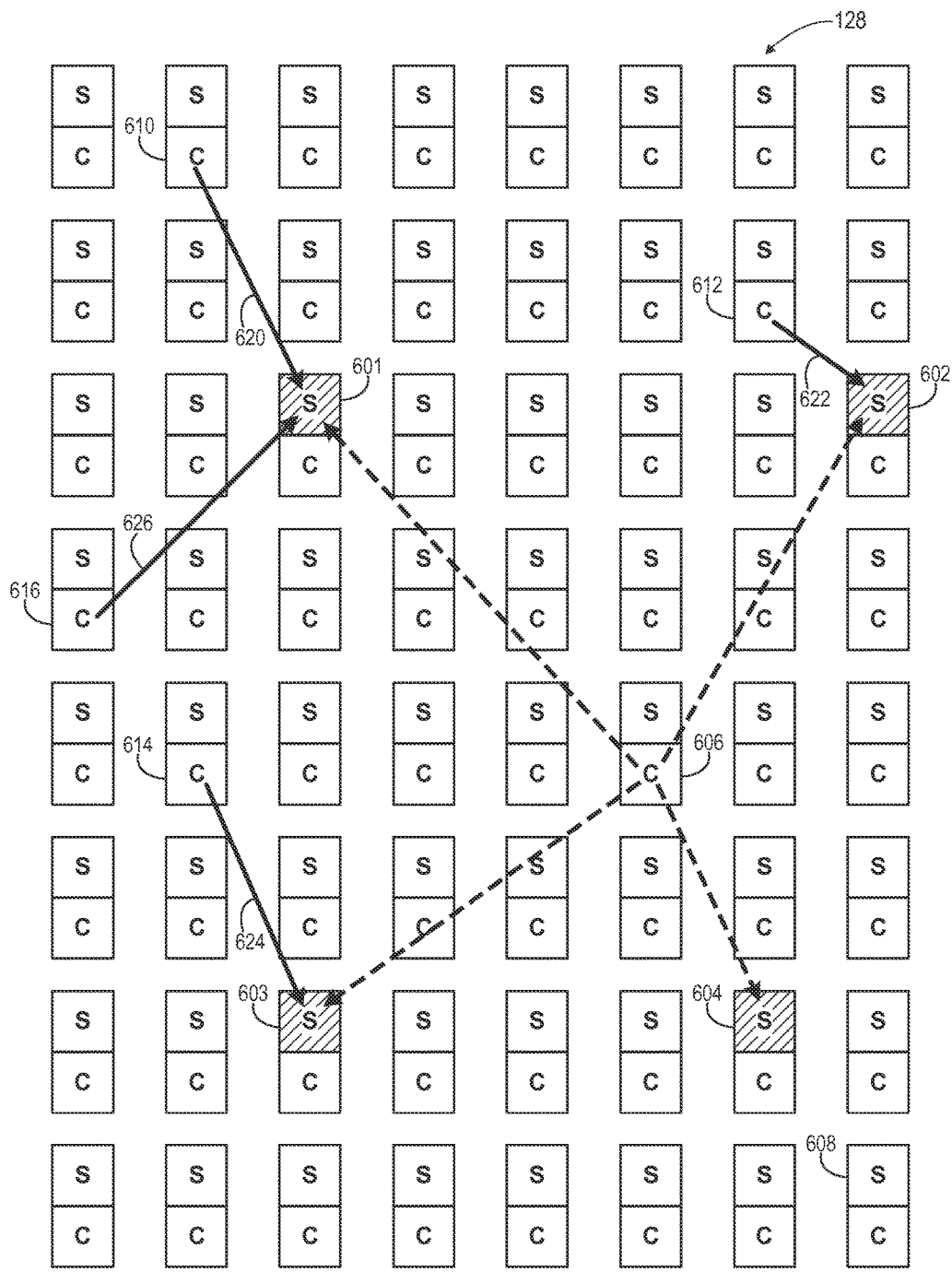
FIG. 6 is a diagram illustrating an example implementation of a hybrid cache as a two-dimensional (2D) mesh of cache slices in accordance with at least one embodiment of the present disclosure.

FIG. 6 illustrates a two-dimensional (2D) slice mesh implementation for the hybrid cache 126 in accordance with some embodiments of the present disclosure. In the preceding, example implementations of the hybrid cache 126 have been described in the context of a relatively low number of slices (e.g., eight) within the set 128 of slices of the hybrid cache 126. However, as also noted above, the techniques and implementations of the present disclosure are not limited to these example numbers. Rather, any number of slices may be implemented in the set 128. To illustrate, in the depicted example of FIG. 6, the hybrid cache 126 implements the set 128 of slices as sixty-four slices (depicted in FIG. 6 as boxes with the letter "S" enclosed therein) arranged an 8×8 2D mesh, with each slice being associated with a corresponding one of sixty-four processor cores (depicted in FIG. 6 as boxes with the letter "C" enclosed therein).

With sixty-four slices in the set 128, memory addresses of an address space associated with this cache may be mapped to subsets of, for example, two slices, four slices, eight slices, sixteen slices, or thirty-two slices. In the particular example depicted, each memory address is mapped to a subset of four slices, such a memory address being mapped to a subset composed of slices 601, 602, 603, and 604. In such a configuration, each subset requires a coherency interconnect with only four drops, and thus when a processor core 606 enacts a coherency operation to ensure that changes to a copy of data in slice 601 are propagated to all other valid copies, only three other slices, slices 602, 603, and 604 are the only slices that need be considered for this coherency operation. In contrast, in a conventional per-core cache utilizing sixty-four slices, each slice would need to be connected to the other sixty-three slices in a coherency fabric, which may be impracticable to implement due to cost, space, or power considerations.

Moreover, by mapping a memory address to more than one slice, the hybrid cache 126 of FIG. 6 may achieve considerably lower cache access latency compared to a conventional address-interleaved cache implementing sixty-four slices. To illustrate, when the slices of a subset are distributed within the 2D mesh, the average distance between the processor cores and a slice of the subset potentially containing a copy of data referenced by a memory request can be lower than the average distance between the processor cores and the single slice that may contain a copy of the data as would be found in a conventional address-interleaved cache. To illustrate, consider a scenario whereby a copy of data is stored in single slice, slice 608, in accordance with a conventional address-interleaved cache. In such instances, there are significant communication distances between distant processor cores, such as processor cores 610, 612, 614, and 616, and the slice 608, and thus any cache access requests from these distant processor cores would experience significant transmission latency and thus inhibit caching performance. In contrast, the distributed nature of the slices 601, 602, 603, and 604 for the corresponding subset enables a slice potentially containing a copy of the data to be much closer to a processor core attempting to access that data. To illustrate, lines 620, 622, 624, 626 represent communication distances between the processor cores 610, 612, 614, 616, respectively, and the closest slice of the subset, each of which is significantly shorter than the distance between the corresponding processor core and the slice 608. Thus, whenever a processor core needs to perform a cache lookup, it may elect to send the request to the closest slice in the subset of slices mapped to the address of the request, and thereby achieving improved cache access latency.

In some embodiments, the apparatus and techniques described above are implemented in a system comprising one or more integrated circuit (IC) devices (also referred to as integrated circuit packages or microchips), such as the processing device 102 described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a processing device having a cache composed of a set of at least three cache slices, a method comprising:
   mapping memory addresses of an address space to the cache such that each memory address maps to a corresponding strict subset of two or more cache slices of the set of at least three cache slices; and
   maintaining a probe filter at the cache, the probe filter having a plurality of entries, each entry configured to store at least a portion of a memory address associated with a cache line stored in the cache and a bit vector having a bit for each slice of the strict subset to which the memory address associated with the cache line is mapped, each bit representing whether a valid copy of the cache line is stored in the corresponding slice of the strict subset.

2. The method of claim 1, wherein mapping memory addresses of the address space to the cache further comprises mapping memory addresses of the address space to the cache such that the slices of a strict subset are exclusive to that strict subset.

3. The method of claim 1, wherein mapping memory addresses of the address space to the cache comprises:
   in response to receiving a cache access request, performing a mapping function at the cache using a memory address of the cache access request to determine an index value; and
   identifying, at the cache, the corresponding strict subset of two or more cache slices based on the index value.

4. The method of claim 3, wherein:
   performing the mapping function comprises performing a modulo X operation on the memory address of the cache access request;
   the index value is based on a remainder result of the modulo X operation; and
   X is an integer equal to the number of strict subsets in the set of at least three cache slices.

5. The method of claim 1, further comprising:
   receiving, at the cache, a cache access request for a specified memory address;
   identifying, at the cache, a corresponding strict subset of at least two slices mapped to the specified memory address;
   accessing the slices of the corresponding strict subset in sequence until a valid copy of a cache line associated with the specified memory address is located in a slice of the corresponding strict subset; and
   performing a cache operation with the cache line.

6. The method of claim 5, wherein accessing the slices of the corresponding strict subset in sequence comprises selecting a slice of the corresponding strict subset to access based on distance information indicating communication distances of the slices of the corresponding strict subset.

7. The method of claim 1, further comprising:
   receiving, at the cache, a cache access request for a specified memory address;
   identifying, at the cache, a corresponding strict subset of at least two slices mapped to the specified memory address;
   accessing an entry of the probe filter that is associated with the specified memory address;
   identifying a slice of the corresponding strict subset having a valid copy of a cache line associated with the specified memory address using the bit vector of the accessed entry; and
   performing a cache operation with the cache line in the identified slice.

8. The method of claim 1, further comprising:
executing software at the processing device to program a storage element with a value, the value representing at least one of: a number of slices of the set to be included in each strict subset; and a number of strict subsets to be formed from the set.

9. A method comprising:
configuring a cache of a processor to have a set of at least three slices allocated among a plurality of strict subsets of at least two slices of the set;
maintaining a probe filter at the cache, the probe filter having a plurality of entries, each entry configured to store at least a portion of a memory address associated with a cache line stored in the cache and a bit vector having a bit for each slice of the strict subset to which the memory address associated with the cache line is mapped, each bit representing whether a valid copy of the cache line is stored in the corresponding slice of the strict subset; and
for a received cache access request:
identifying a strict subset of the plurality of strict subsets based on a memory address specified by the cache access request;
performimg a cache lookup using only the slices of the identified strict subset and based on the bit vector of an entry of the probe filter corresponding to the memory address specified by the cache access request; and
maintaining coherency only between the slices of the identified strict subset in response to performing the cache lookup.

10. A processing device comprising:
a cache comprising:
a set of at least three cache slices, each cache slice to store a corresponding set of cache lines;
cache control logic coupled to the set of at least three cache slices, the cache control logic to map addresses of an address space to the cache such that each address within the address space maps to a corresponding strict subset of two or more cache slices of the set of cache slices, wherein the cache control logic comprises:
subset selection logic to perform a mapping function at the cache using a memory address of a received cache access request to determine an index value; and
slice selection logic to determine the corresponding strict subset of two or more cache slices based on the index value; and
a probe filter having a plurality of entries, each entry configured to store at least a portion of a memory address associated with a cache line stored in the cache and a bit vector having a bit for each slice of the strict subset to which the memory address associated with the cache line is mapped, each bit representing whether a valid copy of the cache line is stored in the corresponding slice of the strict subset.

11. The processing device of claim 10, wherein the cache control logic further is to map memory addresses of the address space to the cache such that the slices of a strict subset are exclusive to that strict subset.

12. The processing device of claim 10, wherein:
the subset selection logic includes logic to perform a modulo X operation on the memory address of the cache access request;
the index value is based on a remainder result of the modulo X operation; and
X is an integer equal to the number of strict subsets in the set of at least three cache slices.

13. The processing device of claim 10, wherein:
in response to receiving a cache access request, the subset selection logic is to identify a corresponding strict subset of at least two slices mapped to a specified memory address of the cache access request; and
the slice selection logic is to sequentially access the slices of the corresponding strict subset until a valid copy of a cache line associated with the specified memory address is located in a slice of the corresponding strict subset.

14. The processing device of claim 13, wherein the slice selection logic is to sequentially access the slices of the corresponding strict subset by selecting a slice of the corresponding strict subset to access based on distance information indicating communication distances of the slices of the corresponding strict subset.

15. The processing device of claim 10, wherein:
in response to receiving a cache access request, the subset selection logic is to identify a corresponding strict subset of at least two slices mapped to a specified memory address of the cache access request;
the slice selection logic is to access an entry of the probe filter that is associated with the specified memory address and identify a slice of the corresponding strict subset having a valid copy of a cache line associated with the specified memory address using the bit vector of the accessed entry; and
the cache control logic is to access the identified slice of the corresponding strict subset to access the cache line.

16. The processing device of claim 10, further comprising:
a storage element to be programmed with a value by software executed at the processing device, the value representing at least one of: a number of slices of the set to be included in each strict subset; and a number of strict subsets to be formed from the set.

17. The processing device of claim 10, further comprising:
a coherency interconnect structure having a number of coherency interconnects equal to the number of slices in the set, each coherency interconnect connecting slices of a corresponding strict subset of at least two slices of the set.

* * * * *